United States Patent
Kobayashi et al.

(10) Patent No.: US 7,280,653 B2
(45) Date of Patent: Oct. 9, 2007

(54) TELEPHONE SYSTEM FOR MAKING CALL TO TELEPHONE NUMBER READ FROM A SHEET

(75) Inventors: Yoshikazu Kobayashi, Kanagawa (JP); Junichi Yamagishi, Kanagawa (JP)

(73) Assignee: NEC Infrontia Corporation, Kanagawa (JP)

(*) Notice: Subject to any disclaimer, the term of this patent is extended or adjusted under 35 U.S.C. 154(b) by 615 days.

(21) Appl. No.: 10/607,971

(22) Filed: Jun. 30, 2003

(65) Prior Publication Data

US 2004/0008838 A1 Jan. 15, 2004

(30) Foreign Application Priority Data

Jul. 1, 2002 (JP) ............... 2002-192145

(51) Int. Cl.
H04M 1/00 (2006.01)
H04M 3/00 (2006.01)
(52) U.S. Cl. ................................. 379/355.1
(58) Field of Classification Search ............... 379/100, 379/14, 355.01, 355.1; 455/564
See application file for complete search history.

(56) References Cited

U.S. PATENT DOCUMENTS

| | | | |
|---|---|---|---|
| 5,144,654 A * | 9/1992 | Kelley et al. ......... | 379/355.09 |
| 5,627,881 A | 5/1997 | Fletcher | |
| 6,594,503 B1 * | 7/2003 | Herzig et al. ......... | 455/550.1 |
| 2002/0058356 A1 | 5/2002 | Horii et al. | |
| 2003/0059032 A1 | 3/2003 | Sato et al. | |

FOREIGN PATENT DOCUMENTS

| | | |
|---|---|---|
| DE | 199 19 577 A1 | 11/2000 |
| EP | 1 122 934 A2 | 8/2001 |
| FR | 2 653 288 A1 | 4/2001 |
| JP | 1-162044 | 6/1989 |
| JP | 2-072752 | 3/1990 |
| JP | 5-153220 | 6/1993 |
| JP | 05-328088 | 12/1993 |
| JP | 6-188962 | 7/1994 |
| JP | 6-233012 | 8/1994 |
| JP | 9-027868 | 1/1997 |
| JP | 10-145512 | 5/1998 |
| JP | 10-175385 | 6/1998 |
| JP | 2001-306457 A | 11/2001 |

* cited by examiner

*Primary Examiner*—Curtis Kuntz
*Assistant Examiner*—Alexander Jamal
(74) *Attorney, Agent, or Firm*—Foley & Lardner LLP

(57) ABSTRACT

There is provided a telephone system, which can surely read a telephone number written on a sheet such as a name card and make a call to the telephone number. OCR reader 3, key input section 4 and calling control section 5 are connected to CPU 1. In telephone directory memory 7 connected to the CPU 1, telephone number data obtained based on written content data read by the OCR reader 3 can be saved as it is or in an edited state, telephone number data newly entered by the key input section 4 can be saved, and the saved data can be taken out at an optional point of time. Identification/determination section 8 connected to the CPU 1 carries out identification and determination to obtain telephone number data from the written content data read by the OCR reader 3 under predetermined conditions.

16 Claims, 4 Drawing Sheets

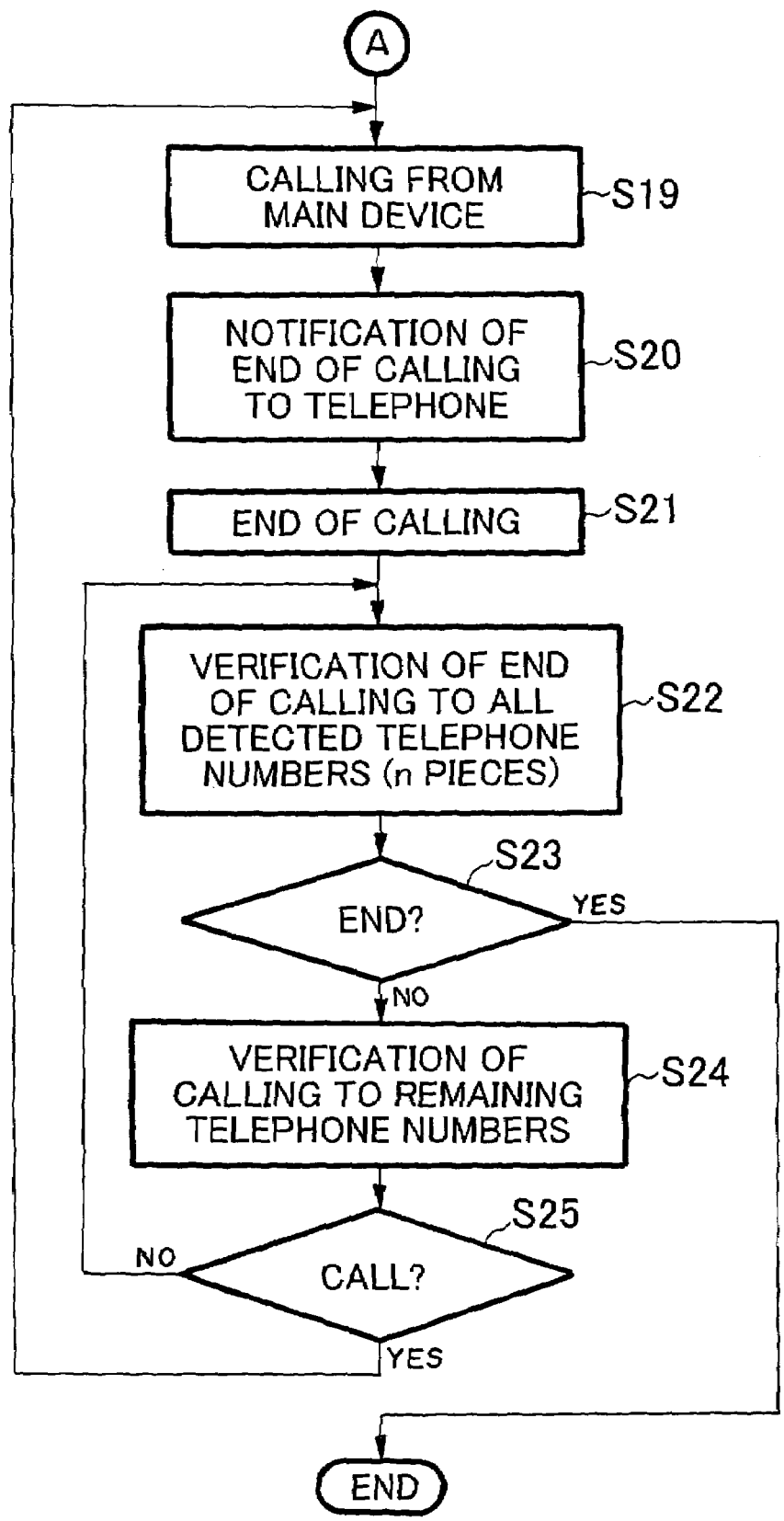

TELEPHONE SYSTEM FOR MAKING CALL TO TELEPHONE NUMBER READ FROM A SHEET

BACKGROUND OF THE INVENTION

1. Field of the Invention

The present invention relates to a telephone system which has a function of making a call to a requested telephone number based on written information read from a sheet such as a name card where the telephone number is written.

2. Description of the Related Art

Conventionally, for a telephone system disclosed, for example, as "TELEPHONE SYSTEM EQUIPPED WITH OPTICAL CHARACTER READING DEVICE" in Japanese Patent Application Publication No. 6(1994)-188962 (JPA 6-188962), there is a technology which a sheet such as a telephone directory or an address book is set on an OCR device, a telephone number of a call opposite party is read optically, and a telephone body enables calling to the read telephone number.

This technology is an excellent system when a target sheet for reading telephone number is mainly a telephone directory, an address book or the like. However, it is difficult to directly deal with a name card where a mixture of different character strings such as a company name, a one's post, a name, a telephone number etc. are written.

Further, for example, as disclosed in Japanese Patent Application Publication No. 2 (1990)-72752 (JPA 2-72752), there is a technology which has a distinctive feature when a sheet such as a name card where a telephone number character has been written is set on an OCR device, and a numeral of a telephone number is extracted from written character data obtained by optical reading.

That is, attention is paid to a particular character preceding the numeral of the telephone number, for example, a character or mark of "telephone" and "TEL" written on the sheet by printing or the like, and identification is made as to whether there is such a particular character or not in the written character data which been optically read. If there is a particular character, a subsequent numeral is determined to be a telephone number, and a call is made to this determined numeral (telephone number) by using a personal computer or the like.

The following disadvantages are inherent in the conventional telephone system.

A first disadvantage is that even if there is a name card of a party for telephone communication, since a telephone number has not been registered in a telephone directory function of the personal computer, a method of writing the telephone number in the telephone directory by a keyboard operation or a method of making a call by a direct dialing operation must be employed, and thus usability is low.

A second disadvantage is that since a user himself must determine whether a kind of the telephone number written in the name card is actually necessary or not, and dial the telephone number when it is actually necessary after the determination, troublesome determination and a complex operation are imposed on the user.

A third disadvantage is that the telephone number data obtained by using the OCR device or the like cannot be corrected, and the telephone number obtained by reading the sheet such as a name card cannot be corrected. This is attributed to the fact that since calling by using the telephone number obtained by reading is automatically started, verification before the calling is impossible.

A fourth disadvantage is that if there are a plurality of telephone numbers written on the sheet such as a name card, the user cannot select a telephone number for a call or make continuous calls. This is attributed to the fact that if there are a plurality of lastly obtained telephone numbers, the user has no right of choice of the telephone numbers.

SUMMARY OF THE INVENTION

Therefore, a first object of the present invention is to provide a telephone system that even if a telephone number has not been registered in a telephone directory of a personal computer, it is not necessary to write it in a telephone directory by a keyboard operation or to make a call by a direct dialing operation.

A second object of the present invention is to provide a telephone system that it is not necessary for a user to determine whether a kind of a telephone number is actually necessary or not.

A third object of the present invention is to provide a telephone system that telephone number data read from a sheet such as a name card can be easily corrected.

A fourth object of the present invention is to provide a telephone system that if there are a plurality of telephone numbers obtained by reading a sheet such as a name card, a user can easily select a telephone number therefrom to call.

According to a first aspect of the present invention, there is provided a telephone system comprising, identification/determination means for detecting a character code which means telephone number indication from written content data obtained by reading a content written on a sheet, and identifying/determining that numbers continuous with the character code are a telephone number; display means for displaying at least the telephone number obtained from the written content data; and calling control means for controlling a call to an opposite party on the basis of the telephone number after verification of the displayed telephone number.

According to a second aspect of the present invention, there is provided a telephone system comprising: identification/determination means for detecting preset information precedent to or continuous with a telephone number, and identifying/determining that numbers precedent to or continuous with the preset information are a telephone number, the preset information being detected from written content data obtained by reading a content written on a sheet; display means for displaying at least the telephone number obtained from the written content data; and calling control means for controlling a call to an opposite party on the basis of the telephone number after verification of the displayed telephone number.

According to a third aspect of the present invention, there is provided a telephone system comprising: identification/determination means for detecting numbers from written content data obtained by reading a content written on a sheet, and identifying/determining that the numbers are a telephone number when a part of the numbers is preset numbers and the first preset number of digits and numbers followed the part of the numbers are the second preset number of digits; display means for displaying at least the telephone number obtained from the written content data; and calling control means for controlling a call to an opposite party on the basis of the telephone number after verification of the displayed telephone number.

According to a fourth aspect of the present invention, there is provided a telephone system comprising: identification/determination means for detecting data which contain a preset group of the numbers of digits and a bracket or hyphen code, from written content data obtained by reading a content written on a sheet, and identifying/determining that the data are a telephone number when the data are detected; display means for displaying at least the telephone number obtained from the written content data; and calling control means for controlling a call to an opposite party on the basis of the telephone number after verification of the displayed telephone number.

BRIEF DESCRIPTION OF THE DRAWINGS

FIG. 3B is a flow chart explaining a continuous operation in the flowchart of FIG. 3A.

DESCRIPTION OF THE PREFERRED EMBODIMENT

Figure 1:
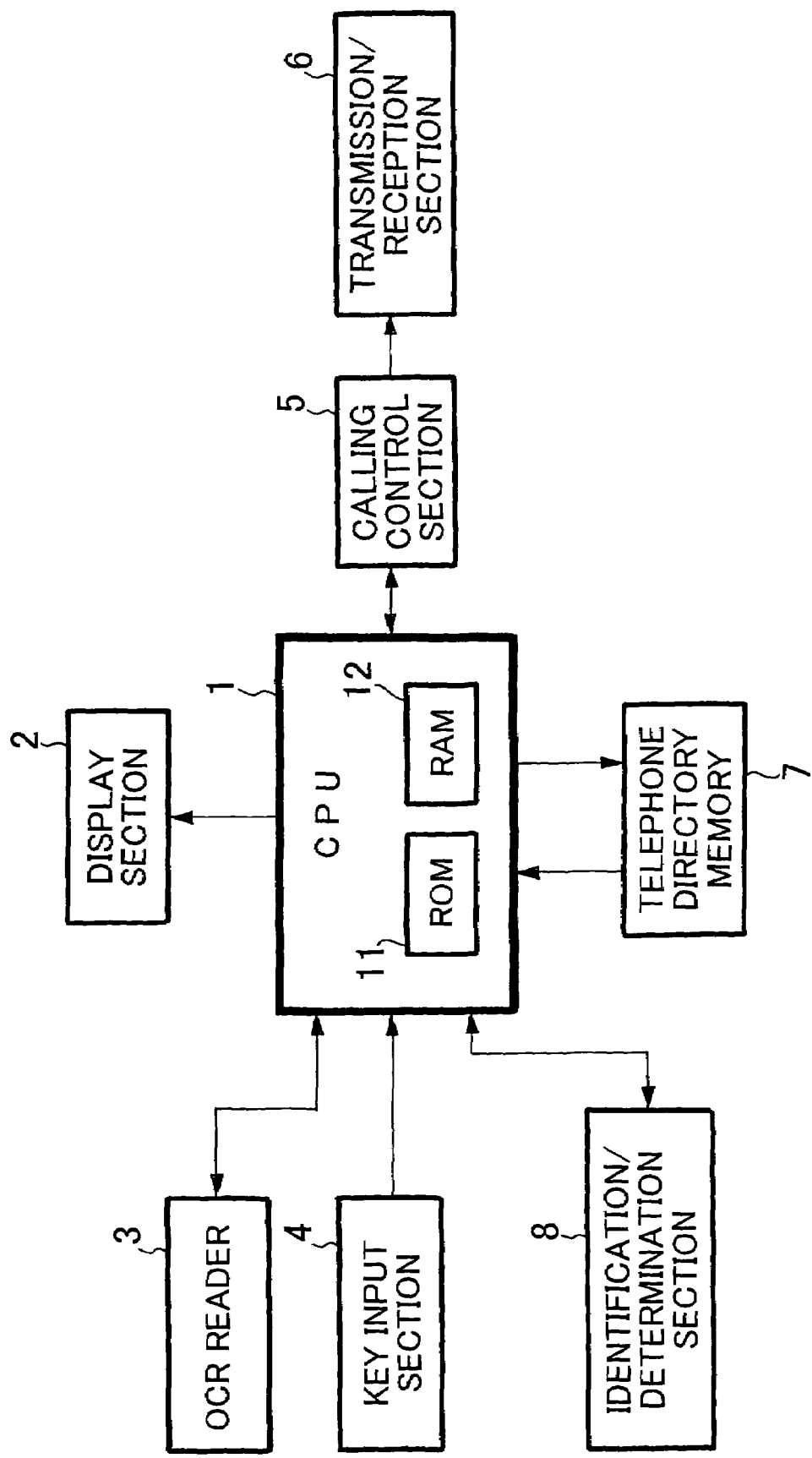
FIG. 1 is a block circuit diagram of a telephone system according to an embodiment of the present invention.

Next, description will be made of a telephone system according to an embodiment of the present invention with reference to FIGS. 1, 2, 3A and 3B.

First, the constitution of the calling control device in the telephone system will be described by referring to FIG. 1. CPU 1 executes complex control of the entire telephone system and comprises ROM 11 and RAM 12. The ROM 11 stores fixed data such as a predetermined operation program, and the RAM 12 reads/writes data temporarily used for a predetermined operation process.

Display section 2, OCR reader 3, key input section 4 and calling control section 5 are connected to the CPU 1. The display section 2 displays data used for a series of operations in the telephone system, such as a transmission/reception telephone number, various operation modes, transmission/reception history and a telephone directory. The OCR reader 3 optically reads a written content printed on a name card, and outputs its data to the CPU 1. The key input section 4 issues various operation commands in the telephone system. The calling control section 5 controls transmission/reception section 6 connected to a subsequent stage thereof for transmission/reception of a call.

Telephone directory memory 7 connected to the CPU 1 is constituted to enable saving of telephone number data based on written content data read by the OCR reader 3 just as it is or in an edited state, saving of telephone number data newly entered by the key input section 4, and taking-out of the saved data at an optional point of time.

Identification/determination section 8 connected to the CPU 1 carries out recognition and determination to obtain the telephone number data from the written content data read by the OCR reader 3 under predetermined conditions (detailed later).

Figure 2:
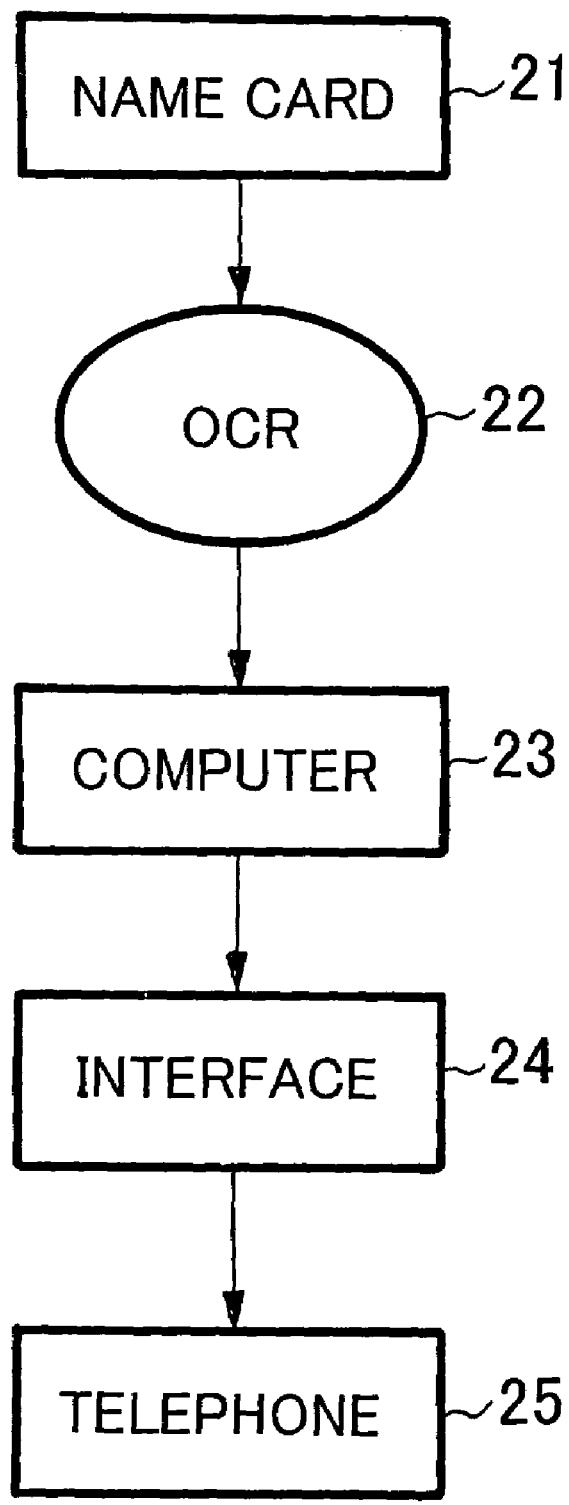
FIG. 2 is a schematic view explaining a rough operation of the telephone system shown in FIG. 1.

A rough operation of the telephone system shown in FIG. 1 is explained with a schematic view of FIG. 2.

Name card 21 is inserted into OCR device 22. A written character content of the name card 21 is read in computer 23 by using the OCR device 22, and the read content is recognized as a telephone number when it is compared with a preset code, a preset numerical value, the preset number of digits or the like and it is found coincident therewith. The data identified as the telephone number is transmitted through interface 24 to telephone 25. After the identified data is displayed on the telephone to be verified, a call is made to the telephone number.

Figure 3A:
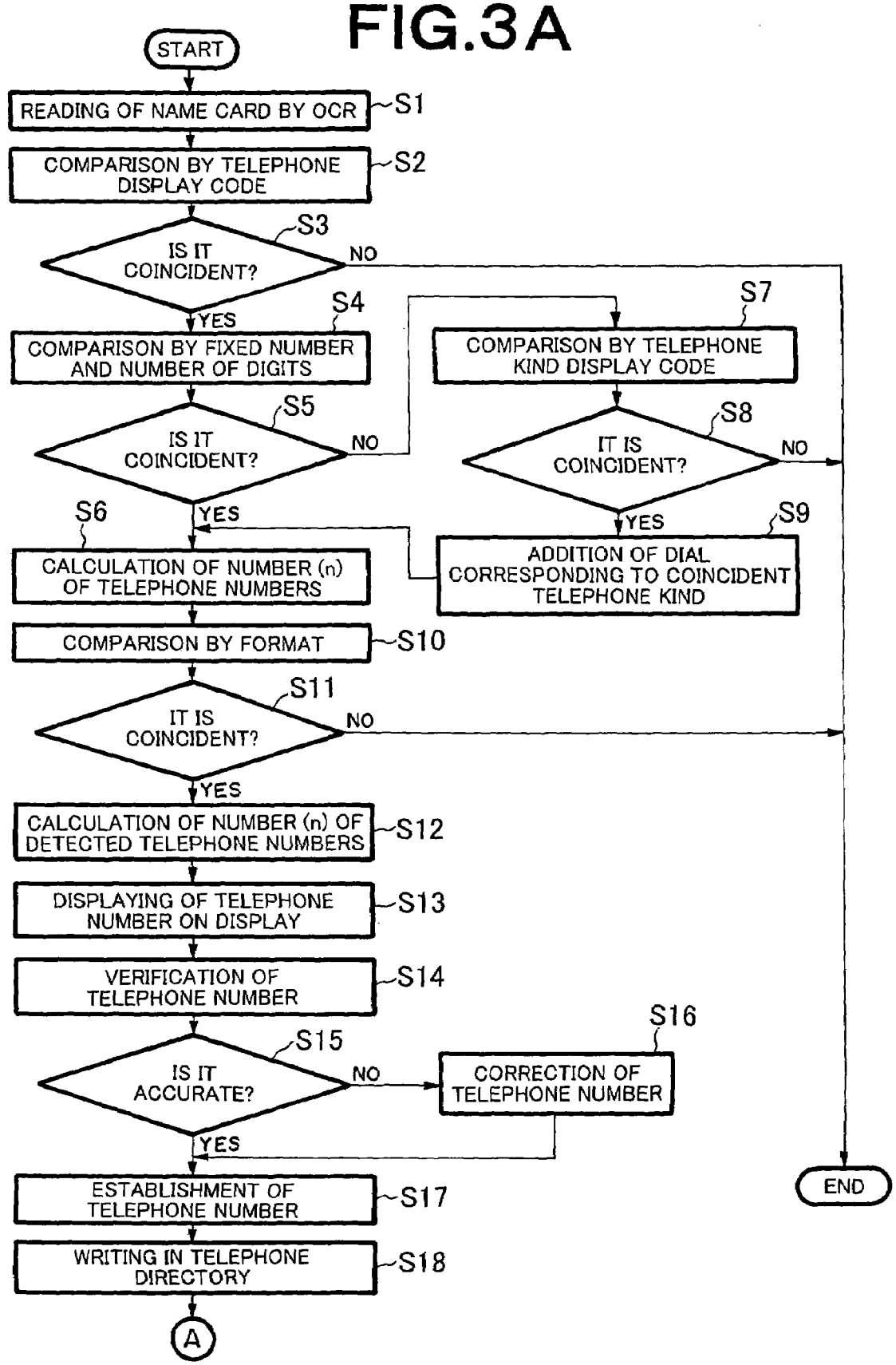
FIG. 3A is a flow chart explaining a detailed operation of the telephone system shown in FIG. 1.

A detailed operation of the telephone system shown in FIG. 1 is explained with flow charts of FIGS. 3A and 3B.

First, in step S1, a written content printed on a name card is read by using the OCR reader 3, and the read written content data are transferred to the RAM 12 of the CPU 1. The read written content data fetched from the CPU 1 are sent to the identification/determination section 8, the read written content data are compared to a telephone indication (display) code to be added to a head of a telephone number, for example, "telephone", "TEL", "Tel", "(tel)" or the like (step S2), and the process proceeds to next step S3.

Here, numbers continuous with the telephone indication code are a telephone number. However, numbers precedent to the preset information may be a telephone number.

In the step S3, determination is made as to whether data that coincides with the telephone indication code exist in the read written content data. If coincident (Yes), the process proceeds to next step S4. If not coincident (No), a series of operations are canceled in the midway to be finished. In the step S4, for written character information following a character coincident with the telephone indication code, comparison is made based on a set constant, for example, an area code (an out-of-town telephone exchange number) of "03", "025", "044", "0294" or the like and the number of digits following a digit corresponding to each constant, for example, comparison is made based on "2 digits", and if a coincident constant is "03", comparison is made based on "8 digits" thereafter. In next step S5, determination is made as to coincidence. If coincident (Yes), the process proceeds to next step S6.

If uncoincidence is determined (No) in the step S5, the process proceeds to step S7. Since there is a possibility that a special kind of a telephone number, for example, "international", "extension", "IP telephone, "Telnet" or the like is included in those found to be noncoincident by the comparison based on the constant and the digits, comparison is made with taken-out character information to the special telephone indication code in the step S7.

A result of the comparison based on the telephone kind indication (display) code in the step S7 is determined to be coincident or noncoincident in step S8. If coincident (Yes), the process proceeds to next step S9. If not coincident (No), a series of operations are canceled in the midway to be finished.

In step S9, the coincident character information is set as a telephone number candidate, a dial corresponding to a telephone kind necessary when a call is made from a main device (calling control device 5) is added, and then the process proceeds to next step S6. In step S9, for example, when "international" is included, a code such as a country code is added, and when "extension" is included, a pilot number is replace.

In the step S6, the number (n pieces) of telephone number candidates in the name card is calculated on the basis of the number of coincident pieces by the comparison based on the constant and the number of digits of the step S4 and the comparison based on the telephone kind indication code of the step S7.

Then, proceeding to step S10, comparison based on a form is carried out. Specifically, a telephone number is generally denoted by using of characters such as "−", "( )" in addition to numerals, comparison is made with selected character information by using a form when such characters are used, for example, a character string form of "2 digits-4 digits-4 digits", "(2 digits) 4 digits-4 digits" or the like, as a criterion. A result of step S10 is determined in step S11. If not coincident (No), a series of operations are canceled in the midway to be finished. If coincident (Yes), the process proceeds to next step S12.

In step S12, the number of effective telephone numbers is calculated as the number (n pieces) of detected telephone numbers from the information written in the name card on the basis of the number of coincident pieces by the comparison based on the form in the step S10. The telephone number is displayed on a display section of a telephone set in next step S13, a displayed content is verified in next step S4, and the process proceeds to step S15.

In step S15, determination is visually made as to whether the telephone number displayed on the display section 2 is correct or not. If correct (Yes), the process proceeds to step S17 to establish the telephone number. On the other hand, if there is an improper spot in the displayed telephone number information (No), the process proceeds to step S16, where the telephone number is corrected by an operation of the key input section 4. Then, the process proceeds to step S17 to establish the telephone number.

By the telephone number verification executed in the step S14 and the telephone number correction executed in the step S16, the telephone number establishment is executed in the step S17.

In next step S18, information of the telephone number established in the step S17 is registered in the telephone directory memory 7 managed as the telephone system by a key operation of the key input section 4 of the telephone, and then the process proceeds to step S19 of FIG. 3B (proceed through a relay point (A) generated for convenience of drawing to the flowchart of FIG. 3B).

In FIG. 3B, in the step S19, a call to the established telephone number is controlled by the calling control section 5, and calling is carried out by the transmission/reception section 6. In next step S20, the execution of the telephone call is notified to a telephone (terminal) used by a user.

After the end of the calling in step S21, the process proceeds to step S22, calling end verification is carried out to determine whether calls have been made to all the number (n pieces) of the detected telephone numbers previously obtained in the step S6 (see FIG. 3A), and determination is made as to whether the calling has been finished or not in next step S23. If finished (Yes), a series of operations are finished. If not finished (No), the process proceeds to step S24 where verification is started as to calling of telephone numbers that remain to be called. The process proceeds to next step S25 to determine whether or not to call. If calling is carried out (Yes), the process returns to the step S19 to re-execute the steps thereafter. If calling is not carried out (No), the process returns to the step S22. When calling is made to the telephone numbers which remain to be called and the end of all the calls is detected in the step S23, a series of operations are finished.

According to the embodiment, the identification and the determination of the telephone numbers are carried out in steps S2, S3, steps S4, S5 and steps S10, S11. However, telephone number identification and determination may be carried out only by steps S2, S3, steps S4, S5, steps S10, S11 or a combination of these steps.

As apparent from the foregoing description, the telephone system of the present embodiment has the following effects.

A first effect is that it is not necessary for the user to operate the dial when a telephone call is made to an opposite party unregistered in the telephone directory. A reason is that by inputting a content written on a sheet such as a name card obtained from the party as character information in the computer, and using a indication character, the number of digits and a form intrinsic to the telephone number, the telephone number can be extracted, and a telephone call can be made.

A second effect is that information of a telephone number of an unregistered person in the telephone directory can be registered in the telephone directory by a slight key operation of the telephone system. As in the case of the first effect, a reason is that the telephone number extracted form the content written on the sheet such as a name card can be optionally sent by the user to the telephone directory managed as the telephone system.

A third effect is that the telephone number extracted from the content written on the sheet such as a name card can be corrected. A reason is that by displaying the detected telephone number data on the display section of the telephone system before a telephone call is made, the user can visually monitor an error and, when an error is discovered, the data can be corrected by the key operation of the telephone system.

A fourth effect is that even if the telephone number extracted from the content written on the sheet such as a name card is other than that of an outside line, the user can make a telephone call without any notice of it. A reason is that depending on the presence of the code used in the process of telephone number detection for the data inputted to the personal computer or the like, a telephone kind of the number can be determined.

A fifth effect is that if there are a plurality of telephone numbers written on the sheet such as a name card, the user can select a telephone number to call therefrom and can call continuously. A reason is that if there are a plurality of detected telephone numbers, the user can determine calls for all the plurality of telephone numbers.

What is claimed is:

1. A telephone system comprising:

determination means for detecting a character code which corresponds to telephone number indication from written content data obtained by reading a content written on a sheet, and for determining that numbers continuous with the character code are a telephone number;

display means for displaying at least the telephone number obtained from the written content data;

calling control means for controlling a call to an opposite party on the basis of the telephone number after verification of the displayed telephone number; and means for sequentially making calls, if there are a plurality of telephone numbers obtained by said determination means, to the plurality of telephone numbers.

2. A telephone system comprising:

determination means for detecting preset information precedent to or continuous with a telephone number, and for determining that numbers precedent to or continuous with the preset information are a telephone number, the preset information being detected from written content data obtained by reading a content written on a sheet;

display means for displaying at least the telephone number obtained from the written content data;

calling control means for controlling a call to an opposite party on the basis of the telephone number after verification of the displayed telephone number; and means for sequentially making calls, if there are a plurality of telephone numbers obtained by said determination means, to the plurality of telephone numbers.

3. A telephone system comprising:

determination means for detecting numbers from written content data obtained by reading a content written on a sheet, and for determining that the numbers are a telephone number when a part of the numbers is preset numbers and a first preset number of digits and numbers followed the part of the numbers are a second preset number of digits;

display means for displaying at least the telephone number obtained from the written content data;

calling control means for controlling a call to an opposite party on the basis of the telephone number after verification of the displayed telephone number; and means for sequentially making calls, if there are a plurality of telephone numbers obtained by said determination means, to the plurality of telephone numbers.

4. A telephone system comprising:

determination means for detecting data which contain a preset group of the numbers of digits and a bracket or hyphen code, from written content data obtained by reading a content written on a sheet, and for determining that the data are a telephone number when the data are detected;

display means for displaying at least the telephone number obtained from the written content data;

calling control means for controlling a call to an opposite party on the basis of the telephone number after verification of the displayed telephone number; and means for sequentially making calls, if there are a plurality of telephone numbers obtained by said determination means, to the plurality of telephone numbers.

5. The telephone system according to claim 1, wherein said determination means includes means for displaying the telephone number on said display means before making a call, and permitting correction of the telephone number.

6. The telephone system according to claim 2, wherein said determination means includes means for displaying the telephone number on said display means before making a call, and permitting correction of the telephone number.

7. The telephone system according to claim 3, wherein said determination means includes means for displaying the telephone number on said display means before making a call, and permitting correction of the telephone number.

8. The telephone system according to claim 4, wherein said determination means includes means for displaying the telephone number on said display means before making a call, and permitting correction of the telephone number.

9. The telephone system according to claim 1, wherein calling data used by said determination means is stored in a telephone directory memory.

10. The telephone system according to claim 2, wherein calling data used by said determination means is stored in a telephone directory memory.

11. The telephone system according to claim 3, wherein calling data used by said determination means is stored in a telephone directory memory.

12. The telephone system according to claim 4, wherein calling data used by said determination means is stored in a telephone directory memory.

13. The telephone system according to claim 1, further comprising means for replacing the telephone number obtained by said determination means with another telephone number corresponding to a preset character string that includes an extension, Telnet, international or IP telephone.

14. The telephone system according to claim 2, further comprising means for replacing the telephone number obtained by said determination means with another telephone number corresponding to a preset character string that includes an extension, Telnet, international or IP telephone.

15. The telephone system according to claim 3, further comprising means for replacing the telephone number obtained by said determination means with another telephone number corresponding to a preset character string that includes an extension, Telnet, international or IP telephone.

16. The telephone system according to claim 4, further comprising means for replacing the telephone number obtained by said determination means with another telephone number corresponding to a preset character string that includes an extension, Telnet, international or IP telephone.

* * * * *